(12) United States Patent
Mraz et al.

(10) Patent No.: US 10,556,282 B2
(45) Date of Patent: Feb. 11, 2020

(54) PORTABLE MICRO-DEBURRING COMPONENT USING MICRO-ELECTRICAL DISCHARGE MACHINING PROCESS

(71) Applicant: SmalTec International, LLC, Lisle, IL (US)

(72) Inventors: Jerry Mraz, Lisle, IL (US); Jonathan Montgomery, Naperville, IL (US)

( * ) Notice: Subject to any disclaimer, the term of this patent is extended or adjusted under 35 U.S.C. 154(b) by 745 days.

(21) Appl. No.: 14/438,828

(22) PCT Filed: Nov. 5, 2013

(86) PCT No.: PCT/US2013/068568
§ 371 (c)(1),
(2) Date: Apr. 27, 2015

(87) PCT Pub. No.: WO2014/074524
PCT Pub. Date: May 15, 2014

(65) Prior Publication Data
US 2015/0298231 A1 Oct. 22, 2015

Related U.S. Application Data

(60) Provisional application No. 61/724,120, filed on Nov. 8, 2012.

(51) Int. Cl.
*B23H 9/02* (2006.01)
*B23H 1/02* (2006.01)
*B23H 1/04* (2006.01)

(52) U.S. Cl.
CPC ............... *B23H 9/02* (2013.01); *B23H 1/02* (2013.01); *B23H 1/04* (2013.01)

(58) Field of Classification Search
CPC .......... B23H 9/00; B23H 9/013; B23H 11/00; B23H 11/003; B23H 9/02
(Continued)

(56) References Cited

U.S. PATENT DOCUMENTS 3,893,013 A * 7/1975 Mironoff ............... B23H 1/022
219/136
4,551,603 A * 11/1985 Rocklin ................... B23H 1/02
219/76.13
(Continued)

FOREIGN PATENT DOCUMENTS

| JP | 6-238526 A | 8/1994 |
| JP | 10-277842 A | 10/1998 |
| JP | 2010-012521 A | 1/2010 |

OTHER PUBLICATIONS

International Searching Authority, International Search Report, dated Feb. 19, 2014.

*Primary Examiner* — Dana Ross
*Assistant Examiner* — Ayub A Maye
(74) *Attorney, Agent, or Firm* — Kinne IP Group; Charles C Kinne (57) ABSTRACT

A deburring subassembly has a controller to generate an electrical current and move a deburring tool bit from a non-deburring position to a range of deburring positions. The electrical current permits deburring of the workpiece without damaging it. A workpiece securement subassembly secures the workpiece for formation on a computer numerical controlled (CNC) machine tool and also holds the workpiece in place for deburring. The electrical current is provided to a deburring tool bit. The controller thereby controls movement of the deburring tool bit to the range of deburring positions and generates the electrical current to deburr the workpiece.

15 Claims, 7 Drawing Sheets (58) Field of Classification Search
USPC ............ 219/69.1, 69.2, 69.15, 69.16, 69.11,
219/69.12, 69.13, 69.17
See application file for complete search history.

(56) References Cited

U.S. PATENT DOCUMENTS

| | | | | |
|---|---|---|---|---|
| 4,780,155 A * | 10/1988 | Salsgiver | ............. | C21D 8/1294 148/111 |
| 5,091,622 A * | 2/1992 | Ohba | ....................... | B23H 7/26 219/69.15 |
| 5,357,073 A * | 10/1994 | Tominaga | ................ | B23H 1/04 219/69.15 |
| 5,530,217 A * | 6/1996 | Knecht | .................... | B23H 7/26 219/69.11 |
| 5,986,231 A * | 11/1999 | Okuya | ..................... | B23H 9/02 219/69.12 |
| 6,118,094 A * | 9/2000 | Hoy | ....................... | B23K 9/013 219/69.1 |
| 6,448,529 B1 * | 9/2002 | Hiraishi | ................. | B23H 1/024 219/69.16 |
| 6,833,524 B2 * | 12/2004 | Krenz | ..................... | B23H 1/00 219/69.11 |
| 2007/0246372 A1 | 10/2007 | Obara et al. | | |
| 2008/0277384 A1 * | 11/2008 | Trimmer | ................. | B23H 1/04 219/69.17 |
| 2010/0163427 A1 * | 7/2010 | Zhan | ....................... | B23H 1/00 205/651 |

* cited by examiner

PORTABLE MICRO-DEBURRING COMPONENT USING MICRO-ELECTRICAL DISCHARGE MACHINING PROCESS

CROSS-REFERENCE TO RELATED APPLICATIONS

This application relates to and claims priority from U.S. Provisional Patent Application Ser. No. 61/724,120, filed Nov. 8, 2012, and PCT Patent Application No. PCT/US2013/068568, filed Nov. 5, 2013.

FIELD OF THE INVENTION

This invention is directed to a portable micro electrical discharge machining (μEDM) based deburring system that is intended to be mounted on the machine tool used to form the workpiece. The invention utilizes the unique characteristics of μEDM to deburr a micropart on an existing machine tool platform. The portable system may be mounted either on a conventional (milling, grinding, turning, etc.) computer numerical controlled (CNC) machine tool or an electrical discharge machining (EDM) CNC machine tool.

The system can either use the cutting tool, also referred to as the tool bit, (conventional or EDM) used to form the workpiece as the deburring tool, or optionally, have the deburring tool mounted to the machine tool, using an electrically isolated kinematic mounted Electrical Discharge Deburring (EDD) Module. During the deburring operation, the workpiece remains fixed in the machine tool used to manufacture it, thus eliminating errors due to moving the workpiece to a separate tool for the deburring operation and eliminating additional setup time and cost.

The portable system comprises a control box, a control cable, and a deburring circuit. The deburring circuit is electrically connected to the tool bit used for deburring. This tool bit may be the bit used to machine the part, or, optionally, the portable system may also further comprises an electrically isolated kinematic mounted EDD Module that is mountable in a variety of conventional and electrical discharge computer numerical controlled machining systems.

BACKGROUND OF THE INVENTION

As demand increases for smaller micro-manufactured parts in the rapidly growing fields of optics, automotive, and medical devices, the impact of burrs within these parts also increases. As generally referred to herein, a burr may be a small piece of material or raised edge that remains attached to a workpiece after machining. A burr may be a fine wire or a projection or raised portion of the surface. The process of removing these unwanted burrs is usually referred to as deburring.

Burrs cause many problems in assembly and operation. Protruding burrs can cause, among other things, electrical shorts, air leaks, jammed mechanisms, increased wear and stress, turbulence and non-laminar liquid and air flow. A burr can physically harm assemblers or end-users. As the size of parts becomes smaller, the size of burrs is reduced; however, the burr-to-feature size ratio increases and thus, conventional deburring processes begin to cause significant surface damage. JOURNAL OF MATERIALS PROCESSING TECHNOLOGY; vol. 209, issue 1; 19 Jul. 2009; pp 5399-5406; "Deburring microfeatures using micro-EDM"; Jeong, et al.

Various machining methods are used to manufacture micro-parts, e.g. parts that are either sub-millimeter in size or include sub-millimeter sized features. Conventional processes such as physical cutting, milling, drilling, turning, etc., inevitably leave behind small bits of material due to the plasticity of the material at the cutting tool interface. Recast burrs are the result of solidification or redeposition of material on the surface, resulting from, for instance, an EDM process. Even though new machining systems reduce the cost of manufacturing micro-parts and features, much of these savings are offset by outdated deburring methods.

Deburring has always been an afterthought in the effort to control manufacturing costs. A company may initially invest hundreds of thousands, even millions, of dollars on a manufacturing center, but give little strategic thought to how to deburr and finish the part. There are still companies employing high paid technicians looking through microscopes removing microburrs from individual pieces with small blades, files and lapping compounds. Each feature can require several minutes of deburring time. This repetitive process exposes employees to stress injuries and their employers to additional liability.

There are currently available various methods of removing burrs on micro-parts and features. These processes include electrochemical polishing, abrasive finishing, thermal deburring and ultrasonic machining, among others by hand. Though all of these methods matured with machining technologies, each of them has its shortcomings.

Current deburring processes can damage or over-machine the surface, change the dimensions of the part, blunt sharp edges, break the edge (which may not be desirable) or require additional cleaning processes to remove etching residues. In many cases, micro-parts and features are actually getting smaller than the tools and media used to deburr them. Within the medical industry and its continued miniaturization of products, removing burrs while maintaining precision tolerances is not just a matter of quality, it is a greater matter of health and safety.

Generally, deburring is considered a secondary process. Even though this manufacturing step has been around since the invention of steel, it still receives little attention in the initial budgeting of product manufacturing and marketing. However, as an afterthought, it can add a substantial cost on the back end of manufacturing a product.

There are currently many approaches to deburring micro-machined parts. Product managers must determine the proper deburring process based on numerous variables, including material, part size, feature size and intricacy.

In some instances, deburring is already processed on the same platform used to manufacture the workpiece or part, but with extensive tooling changes required. In other instances, the parts are removed from the machining platform and deburred in third party CNC (computer numerical controlled) machines with either lasers or high pressure abrasive jets. In many cases workpieces are so intricate that they are deburred by hand with micro-files and tools under a microscope. Each of these processes suffers the significant shortcoming of requiring removal of the part from the original manufacturing tools and tooling by one or more degrees.

Swapping tools within the same platform is currently the most organic deburring process of the group. There are commercially available macro tooling and polishing brushes that are chucked into conventional machine tools to remove burrs in a full contact process. Although these are the most organic processes, these types of deburring tools must deal with referencing and calibration issues for tool run-out and have a comparatively high chance of damaging the part and changing its dimensional characteristics and precision. This method is not being applied to micro features and micro parts due to the large size of the deburring tools.

Another deburring method is to remove the part from the platform and fixture it onto an auxiliary CNC machine tool specifically for deburring. This method adds additional steps and referencing to the process, greatly increasing the difficulties of precision removal of burrs. Also commercially available are abrasive flow machines that use a high pressure (>50 MPa) jet of abrasive media to deburr and finish parts. Laser deburring techniques are also employed in some manufacturing companies.

There is a demand, therefore, for a platform portable deburring system that does not require extensive tooling changes or cleaning of the part after the deburring process. Such a deburring system can be mounted on the machine tool used to form the workpiece. This will reduce costs by increasing efficiencies when compared with existing processes as well as eliminating calibration and referencing inaccuracies inherent in moving the workpiece from one machine to another.

There is also a demand for a platform portable deburring system that imparts no mechanical force to the part being deburred.

There is demand also for a platform portable deburring system tailored for microparts that leaves crater sizes of less than 100 nm, resulting in a virtually damage-free surface with little evidence of the previous burr or the deburring process on the final part.

Micro-electrical discharge machining (µEDM) is uniquely suited to remove unwanted burrs from micro (defined as sub-millimeter-sized) parts and micro features of larger parts. It is a localized non-contact process and will not affect the general surface finish features or dimensions of pre-machined parts.

SUMMARY OF THE INVENTION

In a preferred embodiment, the portable system comprises a control unit, a control cable and a deburring circuit. The control unit is connected to the CNC machine (conventional or EDM) used to manufacture the part via the control cable. The control unit is capable of providing signals to the CNC machine, as well as providing electrical energy, via the deburring circuit, to the deburring tool bit. The deburring circuit is electrically connected to the tool bit used for deburring. This tool bit may be the bit used to machine the part, or, optionally, the deburring system may also further comprise an electrically isolated kinematic mounted EDD Module and tool bit that is mountable in a variety of conventional and electrical discharge computer numerical controlled machining systems. The part to be deburred always remains fixed in the machine tool in which it was manufactured.

It is understood that the tool bit used to manufacture the micropart may be spinning during manufacture (e.g. the system disclosed in Applicant's previously filed "Micro-Electrical Discharged Based Metrology System," described in PCT application Serial No. PCT/US2012/036,168, filed May 2, 2012 and published on Nov. 8, 2012 as WO 2012/151308 A2, the contents of which are hereby incorporated by reference as if fully disclosed herein). Likewise, a tool bit used to deburr using the herein disclosed, portable µEDM based deburring system may also be spinning (or not), depending on the application, during deburring. The optional electrically isolated kinematic mounted EDD Module is configured to be capable of spinning the tool bit used for deburring. The spinning rate is any conventional rate usually used for milling operations of this type.

Depending on the characteristics of the machine tool and the bit used to manufacture the micropart, the tool bit used to manufacture the micropart is itself used as the deburring tool, or the optional kinematic mounted EDD Module and tool bit that is mountable in a variety of conventional machining centers and electrical discharge machining systems is used as the deburring tool bit. If the tool bit used to manufacture the micropart is both electrically conductive and is electrically isolated or isolatable from the CNC machine (whether conventional or EDM) used to manufacture the micropart, the tool bit itself may be used as the µEDM based deburring tool.

If the tool bit used to manufacture the micropart is not electrically conductive, but is electrically isolated or isolatable from the CNC machine (whether conventional or EDM) used to manufacture the micropart, a suitable deburring tool bit can be mounted in the CNC machine used to manufacture the micropart in order to effect the deburring operation.

Finally, if the tool bit used to manufacture the micropart is not electrically isolatable, an electrically isolated kinematic mounted EDD Module and tool bit that is mountable in a variety of conventional and electrical discharge computer numerical controlled machining systems is mounted in the CNC machine and used as the deburring tool bit.

A dielectric is typically applied between the deburring tool and the workpiece. Any usual dielectric may be used, including, but not limited to, EDM-30, Ionoplus 3000, EDM 185, EDM 3001 Lite, EDM Clear 3, EDM 3033, deionized water, air, argon or nitrogen. The tool bit and workpiece may be immersed in a bath of the dielectric, flushed with dielectric or have the dielectric sprayed or misted on them.

Thus, an object of the present disclosure is to provide, in combination with the other features and advantages disclosed herein, a portable micro-electrical discharge machining based deburring system that may be attached to a variety of existing computer numerical controlled (CNC) conventional and EDM machine tools, such that the part or workpiece to be deburred remains fastened to the manufacturing platform in order to effect the deburring operation.

Another object of the present disclosure is to provide, in combination with the other features and advantages disclosed herein, a portable µEDM deburring device that does not require a part to be moved to a separate deburring machine for removal of burrs.

A further object of the disclosure is to provide, in combination with the other features and advantages disclosed herein, a portable µEDM deburring device that does not impart mechanical stress to the part to be deburred.

Yet another object of the disclosure is to provide, in combination with the other features and advantages disclosed herein, a portable µEDM deburring device that does not impart thermal stress to the part to be deburred.

A yet still further object of the disclosure is to provide, in combination with the other features and advantages disclosed herein, a portable µEDM deburring device that does not affect the general surface finish of the part to be deburred.

Still another object of the present disclosure is to provide, in combination with the other features and advantages disclosed herein, a portable µEDM deburring device that does not damage the part to be deburred.

A further object of the present disclosure is to provide, in combination with the other features and advantages disclosed herein, a portable µEDM deburring device that does not over-machine the part.

A still further object of the present disclosure is to provide, in combination with the other features and advantages disclosed herein, a portable μEDM deburring device that does not change the dimensions of the part or the feature.

A yet further object of the present disclosure is to provide, in combination with the other features and advantages disclosed herein, a portable μEDM deburring device that does not blunt sharp edges of the part.

A yet still further object of the present disclosure is to provide, in combination with the other features and advantages disclosed herein, a portable μEDM deburring device that does not break the edge of the part.

Another further object of the present disclosure is to provide, in combination with the other features and advantages disclosed herein, a portable μEDM deburring device that does not require additional cleaning processes to remove deburring residues.

Yet another object of the present disclosure is to provide, in combination with the other features and advantages disclosed herein, a platform portable μEDM deburring device that organically differentiates between the burrs and the surrounding substrate.

The following disclosure provides a platform portable μEDM deburring device that provides the foregoing advantages while at the same time is relatively low in cost to operate and possesses exceptional accuracy and ease of use, and offers the unique characteristics of μEDM to deburr a micropart that remains mounted to the machine tool platform on which the part was manufactured.

BRIEF DESCRIPTION OF THE DRAWINGS

In the detailed description that follows, reference will be made to the following figures:

FIGS. 4 and 5 are photographs illustrating examples of measuring probes and μEDM bits that can be used with a preferred embodiment;

DETAILED DESCRIPTION OF PREFERRED EMBODIMENTS

A μEDM deburring system to deburr micro parts on a machine tool used to manufacture the micro parts is disclosed. The system is portable and, in a preferred embodiment, comprises a control box, a control cable, a deburring circuit electrically connectable to a working tool and an optional electrically isolated kinematic mounted EDD Module. The system is mountable on a variety of conventional and electrical discharge machining systems.

Principles of Operation:

Conventional μEDM machining is a material erosion manufacturing process. Electric sparks in a plasma bubble are used to erode material from an electrically conductive workpiece to form a desired shape. The tool electrode can also be referred to as a "tool bit" but is understood to mean a tool electrode. This tool bit and the workpiece are subjected to a voltage potential and submerged in a dielectric fluid. Initially, as the tool bit approaches the workpiece, the dielectric fluid acts as an insulator, allowing the electric field to increase. But, as the tool bit moves closer to the workpiece, the electric field breaks down the dielectric, forming a plasma bubble between the tool bit and the workpiece. This plasma conducts a flow of energy, a spark, from the workpiece to the tool bit, evaporating material from the workpiece as well as a smaller amount from the tool electrode. This flow of energy depletes the energy in the system, equalizing the electric potential between the tool bit and the workpiece, collapsing the electric field and ending the spark event. Particles of evaporated material cool and are flushed away with the dielectric fluid. With the electrical flow broken, the capacitor recharges and reestablishes the electric field and the voltage potential between the tool bit and the workpiece.

μEDM spark technology is well suited for the deburring of micro-parts and features. It can maintain a consistent spark gap around a workpiece. This spark gap can be adjusted with various energy selections, increasing the ability to create efficient deburring passes from roughing to final for various sizes of burrs. In its most delicate state it leaves crater sizes of less than 100 nanometers resulting in a virtually damage-free surface with little evidence of the previous burr or the deburring process on the final part.

μEDM also imparts no mechanical force to the workpiece material, and due to differing thermal properties of materials, it organically differentiates between the burrs and the workpiece substrate. Burrs are much thinner material than the workpiece substrate and therefore are more susceptible to resistive heating, causing them to ablate at lower applied energies, before the bulk workpiece experiences any damaging residual heat.

Examples of burrs include plastically deformed material produced at workpiece edges as a result of machining or shearing. A burr generally includes all metal extending past the theoretical intersection of the two surfaces surrounding the burr, although in some instances a burr can lie inside the theoretical intersection. A burr can be a sharp ragged projection, firmly adhered, or loosely hanging projection. It can be a swell of material at an edge.

Microburrs are generally distinguished from macroburrs by typically having a thickness of no greater than 0.0005 inch (12.7 micron). Microburrs are also typically characterized as having burr heights no greater than 0.0004 inches (10 microns).

The disclosed technology utilizing a portable μEDM device is capable of removing both macroburrs and microburrs. Thus, the term "burr" is understood to mean any burr, whether macroburr or microburr.

Figure 1:
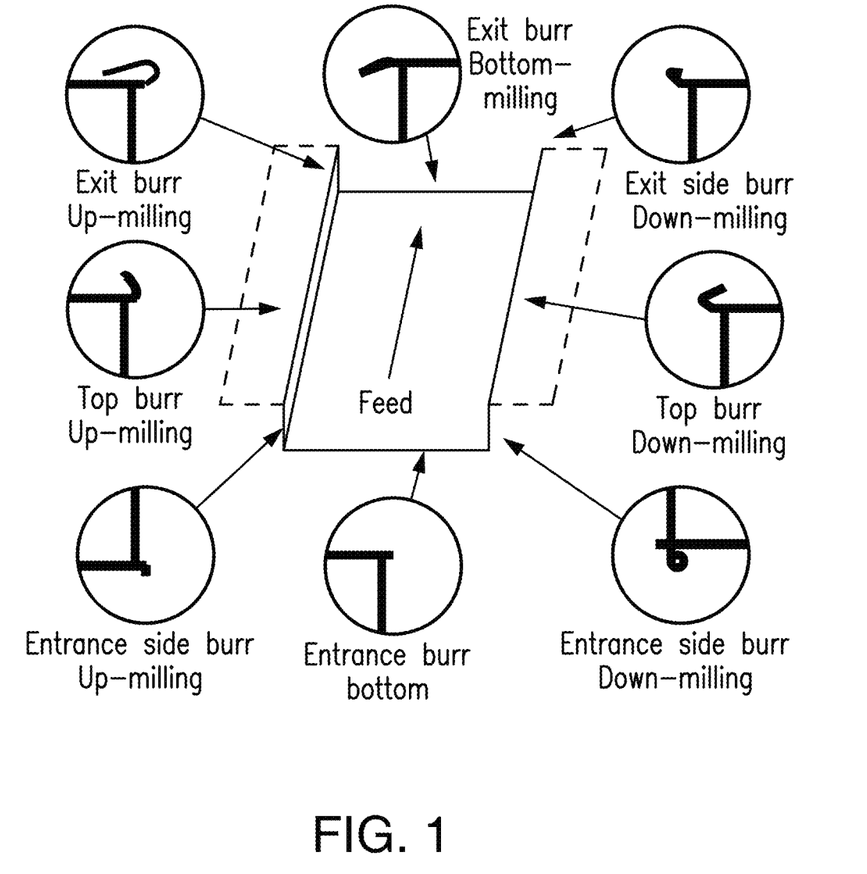
FIG. 1 is a diagram illustrating various types of burrs.

FIG. 1 shows typical burr types and shapes that can be removed with the disclosed μEDM deburring device. In a preferred embodiment, prior to deburring, it is preferable to quantify the μEDM burr removal capabilities. As shown in FIG. 1, the major burr locations are grouped into three categories; exit, entrance and top. Within these groups are up-milling, down-milling and bottom burrs.

The preferred embodiment offers three general advantages over conventional deburring methods. First, the preferred embodiment provides a process that creates a defined working envelope imparting minimal stress into the workpiece, affecting only the local burrs.

Second, the preferred embodiment provides a system that is mountable onto the existing manufacturing platform or machine tool used to manufacture the workpiece, leaving the workpiece in place on the manufacturing platform or machine tool. This feature thereby substantially eliminates calibration errors and maintains the precision with which the workpiece was originally manufactured. By keeping the workpiece on the same platform from which it was manufactured, higher precision deburring can be achieved than would normally be available. Pathing and machine computer numerical control (CNC) functionality are the same that is already posted when the workpiece was created. With this precision, deburring tool bits as small as 5 µm in diameter can be used to remove burrs in even the tightest corners. This is much smaller than conventional tooling or deburring media.

Third, in applications where the tool bit mounted on the machine tool used to manufacture the workpiece has suitable electric properties (having maximum resistivity of 100 Ω-cm and being electrically isolated or isolatable), the tool bit can be left in place when the workpiece is finished and the same tool bit can be used to deburr the workpiece, thus imparting further accuracy and precision to the deburring operation.

Generally, it is expected that any workpiece made of an electrically conductive material having a maximum resistivity of 100 Ω-cm can be deburred, using the preferred embodiment. A non-limiting list of such materials includes aluminum, beryllium-copper alloys, brass, copper, gold, iridium, lead, molybdenum, nickel, nickel-titanium alloys, palladium, platinum, rhenium, stainless steel, steel, tantalum, titanium, tool steel, tungsten, silver, tin, Hastelloy, Inconel, Invar, and Kovar.

Figure 2:
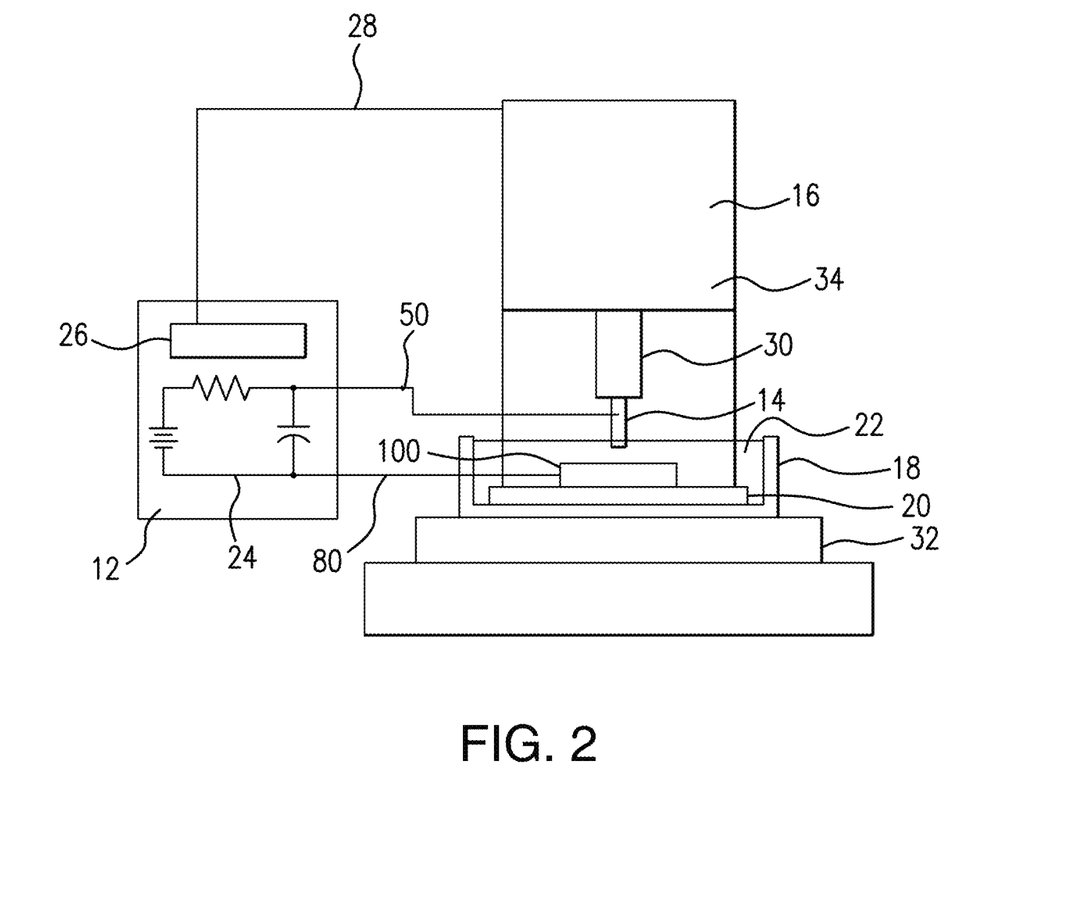
FIG. 2 is a schematic drawing of a portion of a preferred embodiment.

FIG. 2 is a schematic diagram showing a preferred embodiment of µEDM based deburring system 12 of this invention. The µEDM-based deburring system 12 of this embodiment includes a control unit 26 for operating the µEDM-based deburring system 12, a control cable 28 and a deburring circuit 24. The control unit 26 communicates with an interface box (not shown) of a CNC machine 16 via the control cable 28. The CNC machine 16 may be any type, conventional or EDM. A workpiece 100 to be deburred remains mounted in the CNC machine 16.

The CNC machine 16 has an electrically isolated spindle 30 that holds a tool bit 14. It is understood that the tool bit 14 is spinning or not depending on the application, during the deburring operation. The electrically isolated spindle 30 and the tool bit 14 may be the spindle and tool bit used to machine a workpiece 100, or optionally, be substituted for the kinematic mounted (EDD) Module and tool bit used to machine the workpiece 100, if the spindle and tool bit used to machine the workpiece 100 was not and cannot be electrically isolated.

Figure 3:
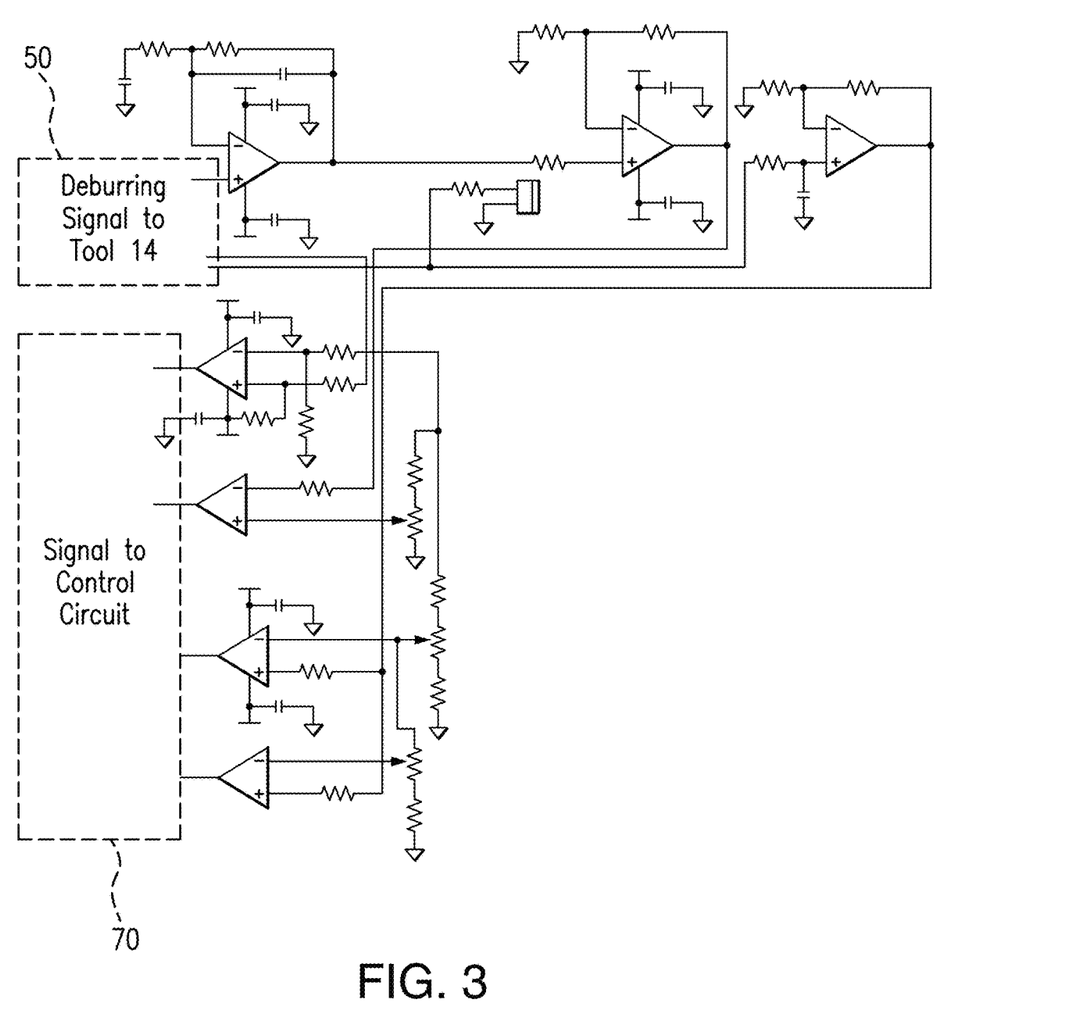
FIG. 3 is a schematic circuit drawing of a portion of a preferred embodiment.

As shown, the µEDM-based deburring system 12 includes a deburring circuit 24 (also known as a discharge circuit) that is electrically connected to the tool 14 and the work piece 100. The deburring circuit 24 includes a resistor capacitor (RC) circuit that runs on a natural frequency of the chosen component values. FIG. 3 shows a more detailed circuit layout for a preferred embodiment of the deburring circuit 24. The deburring circuit 24 of FIG. 3 includes a deburring connection 50 to tool 14. The deburring circuit 24 of FIG. 3 also includes a control unit circuit signal 70 that is fed to the CNC machine 16 via control cable 28. In an alternative embodiment, the deburring circuit 24 may comprise a pulsed direct current (DC) generator with a frequency selected by a waveform generator. Additionally, it is expected that wireless signal transmission could be effected should this be desirable for use in a specific application.

As shown in FIG. 2, a grounding connection 80 joins CNC 16 machine ground to the deburring circuit 24 ground. Optimally, to best ensure proper grounding, the connection 80 is positioned as closely as practicable to the workpiece 100.

In various embodiments, the deburring circuit 24 is designed to operate at between 12.5 picojoules and 72 microjoules, between 5 volts and 120 volts and between 1 picofarad and 10,000 picofarads (pF). For example, in one embodiment, the deburring circuit 24 is designed to operate at between 12.5 picojoules and 72 microjoules, between 5 volts and 120 volts and between 1 picofarad and 10,000 picofarads (pF), to optimize burr removal while preventing damage to the work piece 100. In a more preferred embodiment, the deburring circuit 24 is designed to operate preferably at between 2 nanojoules and 16.5 microjoules, between 20 volts and 100 volts and between 10 picofarads and 3,300 picofarads. In an even more preferred embodiment, the deburring circuit 24 is designed to operate preferably at between 8 nanojoules and 539 nanojoules, between 40 volts and 70 volts and between 10 picofarads and 220 picofarads. These are the energy levels, potentials and capacitances which are expected to maximize burr removal while preventing any damage to workpiece 100. However, as is generally apparent from the disclosure herein, the deburring circuit 24 can be designed to operate at any electrical energy level that provides suitable deburring capability.

In the embodiment of FIG. 2, the µEDM-based deburring system 12 further includes a controller 26 that provides trigger signals to the CNC machine 16. The controller 26 is connected to the CNC machine 16 via the control cable 28. The controller 26 may include coded instructions (software and/or hardware) to provide a user-independent, closed-loop, deburring system. The µEDM-based deburring system 12 is preferably platform-independent, capable of providing the necessary input/output (I/O) to communicate and of providing, via the deburring circuit 24, appropriate deburring energies to tool bit 14 on various third-party machining platforms. This provides a portable, µEDM-based deburring system 12 that can be mounted on third-party platforms, working as an on-board, µEDM-based deburring system in cooperation with the existing, machining components on the third-party platform. The µEDM-based deburring system 12 is preferably capable of working directly with third-party platforms as a self-adaptive, micro-machining platform.

As shown in FIG. 2, the µEDM-based deburring system 12 is a separate component. However, in an alternative embodiment, the µEDM-based deburring system 12 can be manufactured as a component or a feature of the CNC machine 16.

As further illustrated in FIG. 2, the CNC machine 16 includes a positioner 34 that positions the tool bit 14 and the electrically isolated spindle or electrically isolated kinematic mounted (EDD) Module 30 with respect to the workpiece 100 on the CNC machine 16. Optionally, the positioner 34 is capable of moving the tool bit 14 in at least one axis of motion, and preferably in multiple axes of motion. The positioner 34 is controllable from the µEDM-based deburring system 12 via the control unit 26, which communicates with the positioner 34 via the control cable 28.

More preferably, the electrically isolated, kinematic mounted EDD Module 30 is a double V-groove mandrel holder that allows the tool bit 14 to be removed from the CNC machine 16 and later returned (or exchanged for a different tool) for additional deburring with little or no required positional calibration. The double V-groove mandrel holder maintains positional accuracy to less than 0.250 microns between mandrels. This feature enables micro-manufactured parts to be deburred in situ, prior to removing the micro-manufactured parts from the machining platform, either with the tool bit used to manufacture the part (if it is of a suitable type) or with another suitable tool bit. In an alternative embodiment, the electrically isolated kinematic mounted EDD Module 30 may comprise other mechanisms that connect the tool bit 14 to the CNC machine 16 including, for example, a spindle/collet system or a chucked tool bit.

Figure 4:
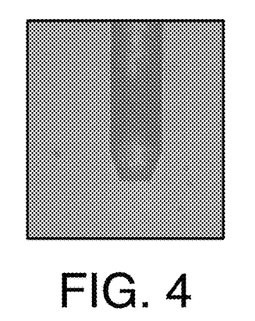

The tool bit 14 can have various shapes and sizes, depending on the shape and material of the workpiece 100 to be deburred. FIG. 4 shows a tool bit 14 comprising a cylindrical tool bit with a rounded conical tip. FIGS. 5.1-5.7 show alternative tool bits that may be used with the μEDM-based deburring system 12. More specifically, FIG. 5.1 shows a tool bit for high aspect ratio forms. FIG. 5.2 shows a rounded tip tool bit. FIG. 5.3 shows a disk or wheel tool bit used to deburr a variety of features including, but not limited to, side-walls, reverse tapers and threads. FIG. 5.4 shows a generally cylindrical tool bit. FIG. 5.5 shows a 70 micron ball end tool bit. FIG. 5.6 shows a rectangular tool bit, which would not spin, for deburring inside corner radii. FIG. 5.7 shows a specialized tool bit for deburring the bottom radii within V-channels and tapered holes.

Figure 6:
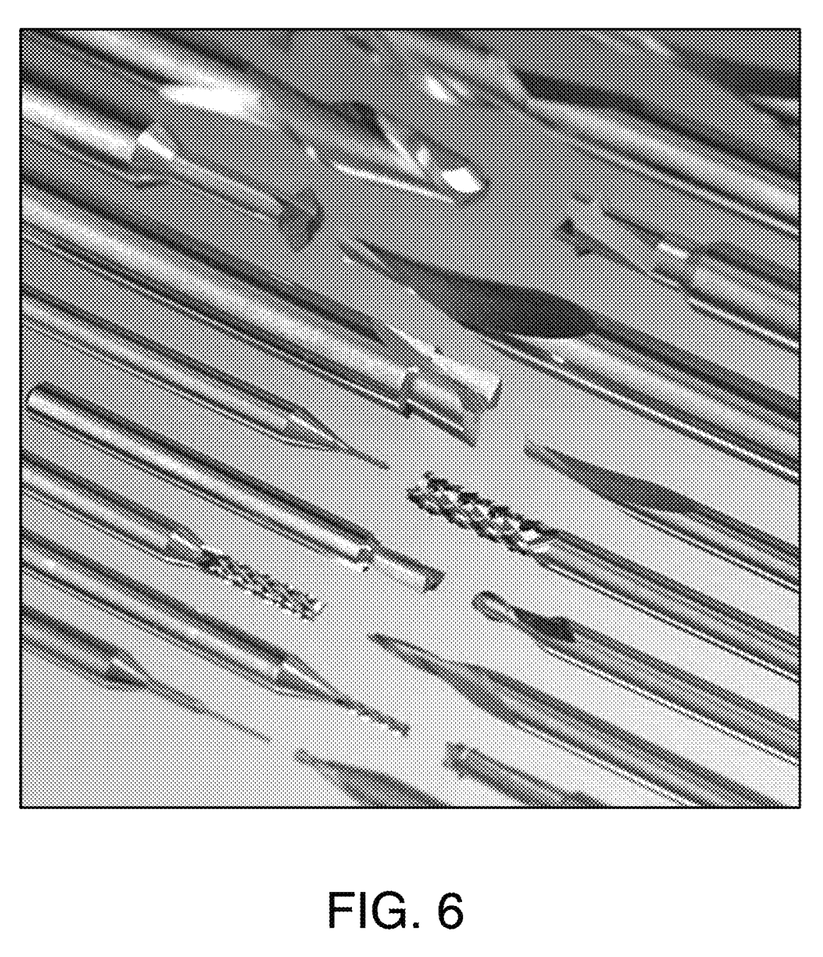
FIG. 6 is a photograph illustrating examples of tool bits that can be used with a preferred embodiment.
Figure 7:
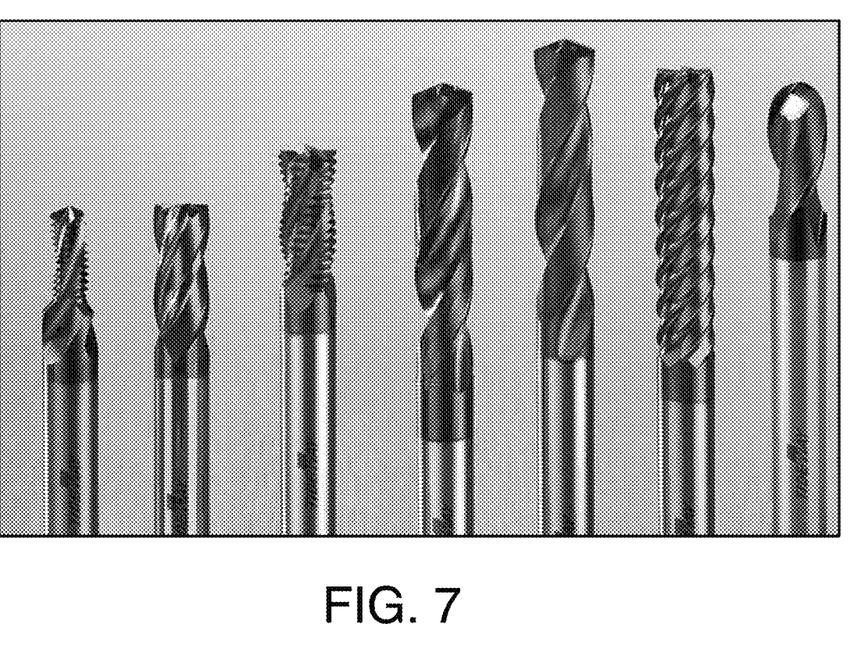
FIG. 7 is a photograph illustrating additional examples of tool bits that can be used with a preferred embodiment.

FIGS. 6 and 7 show further examples of tool bits that can be used with the μEDM-based deburring system 12. It is, of course, understood that the tool bit 14 is not limited to the shapes of FIGS. 4 through 7 and will instead have whatever shape is desired for deburring the part. Optimally, any tool bit used to manufacture the part to be deburred is suitable as long as it has a resistivity of no more than 100 Ω-cm and can be electrically isolated from the manufacturing machine.

Table 1 lists examples of tool bit materials that are suitable for use in the μEDM-based deburring system 12.

TABLE 1

| Suitable tool bit materials for use in μEDM-based deburring system 12 |
| --- |
| Copper |
| Tungsten |
| Brass |
| Steel |
| Graphite |
| Carbide |

Table 2 lists examples of tool bit types that are suitable for use in the μEDM-based deburring system 12.

TABLE 2

| Suitable tool bit types for use in μEDM-based deburring system 12 |
| --- |
| End Mill |
| Ball end mill |
| Drill bit |
| Lollipop bit or end mill |

As further shown in FIG. 1, the CNC machine 16 includes a tank 18 with a work surface 20. The workpiece 100 is mounted on a platform 32. Preferably, the tank 18 is filled with a dielectric fluid 22, although this is not required. The dielectric fluid 22 may alternatively be sprayed, flushed or misted as it is used.

The dielectric fluid 22 may comprise de-ionized water, a standard machining coolant, gas, such as air, argon or nitrogen, or a standard μEDM dielectric fluid or dielectric oil. Examples of dielectric fluids are listed in Table 3.

TABLE 3

| Example Dielectrics | | |
| --- | --- | --- |
| Fluid Name (supplier) | Viscosity | Dielectric Strength |
| EDM-30 (CLC Lubricants, Geneva, IL) | 3.4 cSt (centistokes) | High |
| IonoPlus 3000 (Hirschmann) | 2.8 cSt | High |
| EDM 185 (Commonwealth Oil) | 1.87 cSt | High |
| EDM 3001 Lite (4Machining.com) | 3.8 cSt | High |
| EDM Clear-3 (4Machining.com) | 3.6 cSt | High |
| EDM 3033 (4Machining.com) | 3.5 cSt | High |

In operation, the μEDM deburring system 12 is attached to the CNC machine 16 via control cable 28 and the deburring circuit 24 is electrically connected, via any suitable means, such as a brush system, to tool bit 14 via deburring connection 50. The workpiece 100 is connected to ground if it is not already grounded. As shown in FIG. 2, the grounding connection 80 joins the CNC 16 machine ground to the deburring circuit 24 ground. Optimally, the connection 80 is as close to the workpiece 100 as practicable.

Working with controller 26, the μEDM deburring system 12 triggers the CNC machine 16 to move the tool bit 14 through suitable pathing provided by machine computer numerical control (CNC) functionalities that are desired, depending on the type of burr being removed. These pathings may be the same as those that were posted when the workpiece 100 was created, or there may be subsequent alternate pathing, and machine computer numerical control (CNC) functionalities, that are desired.

While moving the tool bit 14 through this machining pass, the controller 26 also supplies, via deburring circuit 24, an electrical energy suitable for deburring the workpiece 100. Optimally, the workpiece 100 is maintained in place after the last machining pass while the deburring operation takes place.

Because tool bit 14 is moved through the same pathing and machine computer numerical control (CNC) functionality that were posted when the workpiece 100 was created in CNC machine 16, the gap between the work piece 100 and the tool bit 14 is sufficiently small such that a dielectric breakdown occurs and the workpiece 100 is deburred. The spark energy resulting from the dielectric breakdown is sufficiently high to ablate the burrs but does not cause damage to work piece 100.

In one example, the spark energy resulting from the dielectric breakdown is between 12.5 picojoules and 72 microjoules. In another example, the spark energy resulting from the dielectric breakdown is between 2 nanojoules and 16.5 microjoules. In yet another example, the spark energy resulting from the dielectric breakdown is between 8 nanojoules and 539 nanojoules.

Figure 8:
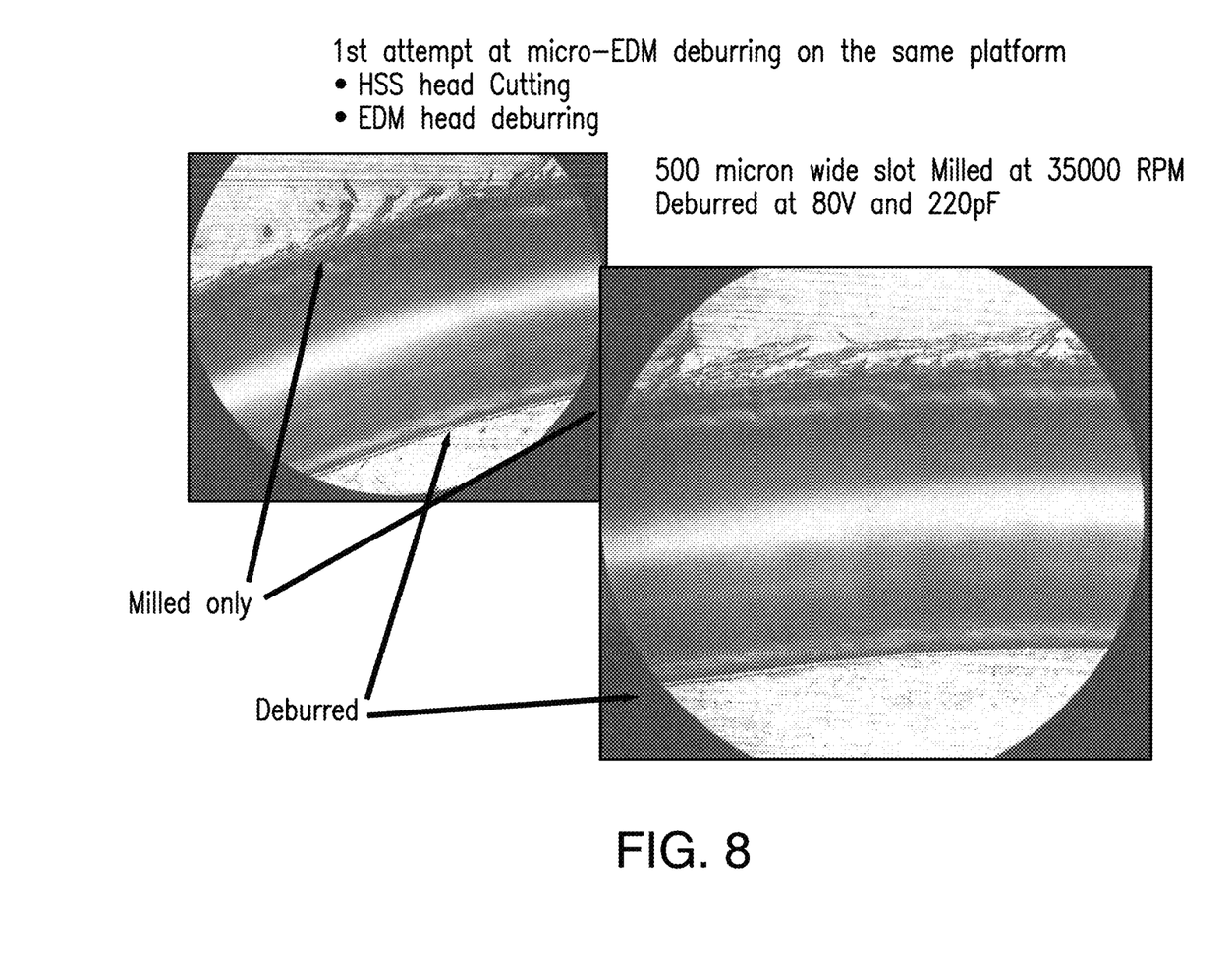
FIG. 8 is a photograph of a part that has been partially deburred using a preferred embodiment.
Figure 51:
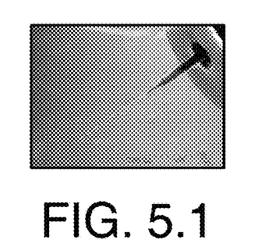
Figure 52:
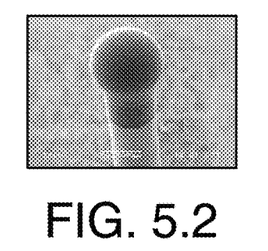
Figure 53:
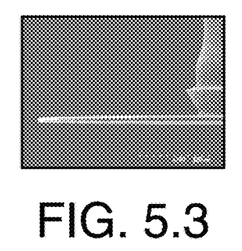
Figure 54:
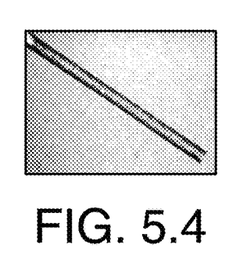
Figure 55:
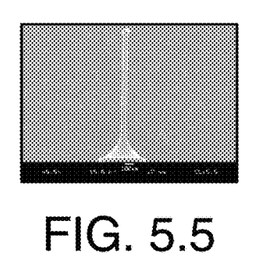
Figure 56:
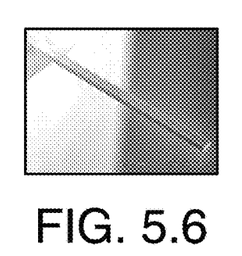
Figure 57:
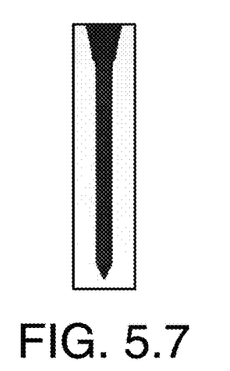

FIG. 8 illustrates electron micrographs of the effects of the disclosed μEDM deburring system on a conventionally machined part, using the tool bit used to machine the part as the deburring tool bit. The micrographs show a 500 micron wide slot milled into stainless steel at 35000 RPM with a conventional carbide high speed tool bit. Leaving the milled workpiece in place in the machine tool, the disclosed μEDM deburring system was attached the machine tool used to mill the slot as described above, and using the same platform and tool bit as was used for machining the slot, the bottom of the slot was deburred at 80V and 220 pF, using CLC Chem Finish EDM-30 (CLC Lubricants, Geneva, Ill.) as the dielectric fluid. As shown in the micrographs, the top of the slot was left un-deburred for comparison.

Thus, as shown in the preferred embodiments, the control box is attached to the interface box of the CNC machine via the control cable, and the deburring circuit attaches to the working tool bit of the CNC machine. Electrical current is transferred to the working tool bit and the electrical current is controlled by the control box. To execute the deburring operation, the control box triggers the CNC machine to follow a machining pass over the part to be deburred, while a suitable amount of electrical current is transferred, via the deburring circuit, to the tool bit (now being used as a μEDM based deburring tool). This ablates the burrs on the part.

Examples of the sequence of operation are as follows. The control box may trigger the CNC machine to follow the last-posted machining pass over the part as the deburring machining pass. The control box may also trigger the CNC machine to follow a modification of the last-posted machining pass, for instance, to back off a set distance from the surface of the part to perform the deburring operation. Alternatively, the control box may trigger the CNC machine to perform multiple deburring passes with different parameters, e.g., of applied electric energy or distance from the part. The control box may also trigger the CNC machine to follow possible subsequent alternate paths that may be necessary depending on the type of burr being removed.

The control box may be attached to the interface box of the CNC machine via the control cable. An optional, electrically isolated kinematic mounted EDD Module and μEDM based deburring tool bit may be mounted in the CNC machine. The deburring circuit is attached to this tool bit. The optional, electrically isolated kinematic mounted EDD Module and μEDM based deburring tool bit is mountable in a variety of conventional and electrical discharge computer numerical controlled machining systems.

The deburring circuit is attached to this tool bit such that electrical current is transferred to the deburring tool and the electrical current is controlled by the control box. The deburring operation is then carried out by the control box instructing the CNC machine to, for example, follow the last-posted machining pass over the part to be deburred, while a suitable electrical current is transferred, via the deburring circuit, to the μEDM based deburring tool bit to ablate the burrs on the part.

Thus, the platform portable μEDM deburring device comprises a control box, control cable, a deburring circuit electrically connectable to a working tool and an optional electrically isolated kinematic mounted EDD Module and tool bit. The platform portable μEDM deburring device may be added to new manufacturing platforms or retrofitted onto existing manufacturing platforms such that the part to be deburred is not moved from the platform on which was manufactured in order to effect the deburring operation.

In one embodiment, the part to be deburred is not moved from the manufacturing platform on which it was machined in order to effect the deburring operation. The portable device uses the working tool bit of the existing machine as the μEDM deburring tool bit.

In another embodiment, the μEDM deburring tool bit is a separate, electrically isolated, kinematic mounted EDD Module and deburring tool bit.

It is preferred that the μEDM deburring tool bit is comprised of an electrically conductive material having maximum resistivity of 100 Ω-cm. More preferably, the μEDM deburring tool bit is comprised of tungsten, steel, graphite, carbide, copper, brass or molybdenum. The workpiece preferably comprises an electrically conductive material such as, for example, aluminum, beryllium-copper alloys, brass, copper, gold, iridium, lead, molybdenum, nickel, nickel-titanium alloys, palladium, platinum, rhenium, stainless steel, steel, tantalum, titanium, tool steel, tungsten, silver, tin, Haste'lay, Inconel, Invar, and/or Kovar.

It is further preferred that the μEDM based deburring device operates at energy levels, potentials and capacitances which are expected to maximize burr removal while preventing any damage to the workpiece. For example, these conditions may be selected to be between 12.5 picojoules and 72 microjoules, between 5 volts and 120 volts and between 1 picofarads and 10,000 picofarads. Alternatively, these conditions may be selected to be between 2 nanojoules and 16.5 microjoules, between 20 volts and 100 volts and between 10 picofarads and 3,300 picofarads. Another alternative range of these conditions may be selected to be between 8 nanojoules and 539 nanojoules, between 40 volts and 70 volts and between 10 picofarads and 220 picofarads.

The dielectric fluid may be selected from the group consisting of a dielectric oil, Rustlick EDM-30, Ionoplus 3000, EDM 185, EDM 3001 Lite, EDM Clear 3, EDM 3033, deionized water, gas, air, argon or nitrogen and a machine coolant.

It is preferred that the μEDM deburring device produces a maximum surface roughness, $R_{max}$ (defined as the height of the highest peak relative to the lowest valley on the surface) of less than about 2 microns. Even more preferably, the μEDM deburring device produces maximum surface roughness, $R_{max}$ of less than about 1 micron. Yet more preferably, the μEDM deburring device produces maximum surface roughness, $R_{max}$ of less than about 100 nanometers. Still more preferably, the μEDM deburring device produces maximum surface roughness, $R_{max}$ of less than about 70 nanometers. Ideally, the μEDM deburring device produces maximum surface roughness, $R_{max}$ of less than about 30 nanometers.

The described embodiments are to be considered in all respects only as illustrative and not restrictive, and the scope of the invention is, therefore, indicated by the appended claims rather than by the foregoing description. Those of skill in the art will recognize changes, substitutions and other modifications that will nonetheless come within the scope of the invention and range of the claims.

What is claimed is:

1. A portable micro-electrical discharge machining based deburring system for an electrically conductive workpiece, the deburring system being attachable to a computer numerical controlled (CNC) machine tool and comprising;
  a controller subassembly having a control unit and a deburring circuit, the controller subassembly constructed and arranged to control and generate an electrical energy for deburring and to control movement of a deburring tool bit from a non-deburring position to a range of deburring positions;
  the electrical energy for deburring having an energy level between 12.5 picojoules and 72 microjoules, a potential between 5 volts and 120 volts and a capacitance between 1 picofarad and 10,000 picofarads, so as to permit deburring of the electrically conductive workpiece without damage to the electrically conductive workpiece:

a workpiece securement subassembly constructed and arranged to secure the portable micro-electrical discharge machining based deburring system to the electrically conductive workpiece on the computer numerical controlled (CNC) machine tool whereby the electrically conductive workpiece remains fixed on the CNC machine during deburring; and an electrical energy delivery subassembly constructed and arranged to transfer the electrical energy for deburring from the controller subassembly to the deburring tool bit;

whereby the controller subassembly controls movement of the deburring tool bit to the range of deburring positions and generates the electrical energy to deburr the workpiece.

2. The portable micro-electrical discharge machining based deburring system for an electrically conductive workpiece of claim 1, the workpiece securement subassembly being further configured to secure the deburring system to the electrically-conductive workpiece on a grinding computer numerical controlled (CNC) machine tool.

3. The portable micro-electrical discharge machining based deburring system for an electrically conductive workpiece of claim 1, the workpiece securement subassembly being further configured to secure the deburring system to the electrically conductive workpiece on a milling computer numerical controlled (CNC) machine tool.

4. The portable micro-electrical discharge machining based deburring system for an electrically conductive workpiece of claim 1, the workpiece securement subassembly being further configured to secure the deburring system to the electrically conductive workpiece on a turning computer numerical controlled (CNC) machine tool.

5. The portable micro-electrical discharge machining based deburring system for an electrically conductive workpiece of claim 1, the workpiece securement subassembly being further configured to secure the deburring system to the electrically conductive workpiece on an electrical discharge computer numerical controlled (CNC) machine tool.

6. The portable micro-electrical discharge machining based deburring system for an electrically conductive workpiece of claim 1, whereby a tool bit used to manufacture the electrically conductive workpiece in the CNC machine tool is used to deburr the electrically conductive workpiece.

7. The portable micro-electrical discharge machining based deburring system for an electrically conductive workpiece of claim 1, further comprising an electrically isolated kinematic mounted Electrical Discharge Deburring (EDD) Module mounted on the computer numerical controlled (CNC) machine tool, the electrically isolated kinematic mounted Electrical Discharge Deburring (EDD) Module being constructed and arranged to hold the deburring tool bit.

8. The portable micro-electrical discharge machining based deburring system for an electrically conductive workpiece of claim 1, wherein the controller subassembly further comprises a resistor-capacitor (RC) deburring circuit configured to run on a natural frequency.

9. The portable micro-electrical discharge machining based deburring system for an electrically conductive workpiece of claim 1, wherein the controller subassembly further comprises a deburring circuit having a pulsed direct current (DC) generator with a frequency selected by a wave form generator.

10. The portable micro-electrical discharge machining based deburring system for an electrically conductive workpiece of claim 1, wherein the deburring tool bit comprises one of a cylindrical tool bit with a rounded conical tip, a cylindrical tool bit with a flat tip, a lollipop tool bit, a rectangular tool bit, a wheel tool bit and a tapered tool bit.

11. The portable micro-electrical discharge machining based deburring system for an electrically conductive workpiece of claim 1, the electrical energy further having an energy level selectable between 2 nanojoules and 16.5 microjoules, a potential selectable between 20 volts and 100 volts and a capacitance selectable between 10 picofarads and 3,300 picofarads.

12. The portable micro-electrical discharge machining based deburring system for an electrically conductive workpiece of claim 1, the electrical energy further having an energy level selectable between 8 nanojoules and 539 nanojoules, a potential selectable between 40 volts and 70 volts and a capacitance selectable between 10 picofarads and 220 picofarads.

13. The portable micro-electrical discharge machining based deburring system for an electrically conductive workpiece of claim 7, wherein the electrically isolated kinematic mounted Electrical Discharge Deburring (EDD) Module mounted in the computer numerical controlled (CNC) machine tool comprises a spindle collet system.

14. The portable micro-electrical discharge machining based deburring system for an electrically conductive workpiece of claim 7, wherein the electrically isolated kinematic mounted Electrical Discharge Deburring (EDD) Module mounted in the computer numerical controlled (CNC) machine tool comprises a double V-groove mandrel holder.

15. A portable micro-electrical discharge machining based deburring system for an electrically conductive workpiece, the deburring system being attachable to a computer numerical controlled (CNC) machine tool and comprising:

a controller subassembly having a control unit and a deburring circuit, the controller subassembly constructed and arranged to control and generate an electrical energy for deburring and to control movement of a deburring tool bit from a non-deburring position to a range of deburring positions;

the electrical energy for deburring having an energy level between 8 nanojoules and 539 nanojoules, a potential between 40 volts and 70 volts and a capacitance between 10 picofarads and 220 picofarads, so as to permit deburring of the electrically conductive workpiece without damage to the electrically conductive workpiece;

a workpiece securement subassembly constructed and arranged to secure the portable micro-electrical discharge machining based deburring system to the electrically conductive workpiece on the computer numerical controlled (CNC) machine tool, the computer numerical controlled (CNC) machine tool further being an electrical discharge computer numerical controlled (CNC) machine tool whereby the electrically conductive workpiece remains fixed on the (CNC) machine during deburring;

an electrically isolated kinematic mounted Electrical Discharge Deburring (EDD) Module mounted on the computer numerical controlled (CNC) machine tool, the electrically isolated kinematic mounted Electrical Discharge Deburring (EDD) Module being constructed and arranged to hold the deburring tool bit; and an electrical energy delivery subassembly constructed and arranged to transfer the electrical energy for deburring from the controller subassembly to the deburring tool bit;

whereby the controller subassembly controls movement of the deburring tool bit to the range of deburring positions and generates the electrical current to deburr the electrically) conductive workpiece.

* * * * *